United States Patent
Chen et al.

(10) Patent No.: US 7,215,659 B1
(45) Date of Patent: May 8, 2007

(54) REMOTELY-COOPERATIVE SCHEDULING SOLUTION FOR MODERATING WIRELESS PROTOCOLS

(75) Inventors: Minghua Chen, Irvine, CA (US); Ping Liang, Irvine, CA (US)

(73) Assignee: Oxford Semiconductor, Inc., Milpitas, CA (US)

(*) Notice: Subject to any disclaimer, the term of this patent is extended or adjusted under 35 U.S.C. 154(b) by 906 days.

(21) Appl. No.: 10/211,954

(22) Filed: Jul. 31, 2002
(Under 37 CFR 1.47)

Related U.S. Application Data

(60) Provisional application No. 60/367,663, filed on Mar. 22, 2002, provisional application No. 60/336,339, filed on Oct. 18, 2001.

(51) Int. Cl.
*H04Q 7/24* (2006.01)
(52) U.S. Cl. .................. 370/338; 370/445; 370/466; 455/63.1; 455/63.2
(58) Field of Classification Search ............. 370/338, 370/330, 437, 337, 466, 443, 447, 461, 329, 370/342, 445; 455/63.1, 63.2, 67.13
See application file for complete search history.

(56) References Cited

U.S. PATENT DOCUMENTS

| | | | |
|---|---|---|---|
| 5,042,083 A * | 8/1991 | Ichikawa | .................. 455/517 |
| 5,682,381 A | 10/1997 | Sekihata et al. | |
| 5,852,405 A | 12/1998 | Yoneda et al. | |
| 6,278,693 B1 | 8/2001 | Aldred et al. | |
| 6,405,257 B1 | 6/2002 | Gersht et al. | |
| 6,600,726 B1 | 7/2003 | Nevo et al. | |
| 6,690,657 B1 | 2/2004 | Lau et al. | |
| 6,775,258 B1 | 8/2004 | van Valkenburg et al. | |
| 6,928,266 B1 * | 8/2005 | Nevo et al. | ................ 455/63.3 |
| 2001/0010689 A1 | 8/2001 | Awater et al. | |
| 2002/0061031 A1 | 5/2002 | Sugar et al. | |
| 2002/0136184 A1 | 9/2002 | Liang et al. | |
| 2002/0136233 A1 | 9/2002 | Chen et al. | |
| 2002/0173272 A1 | 11/2002 | Liang et al. | |
| 2002/0191677 A1 | 12/2002 | Chen et al. | |
| 2003/0054827 A1 | 3/2003 | Scmidt et al. | |
| 2003/0058830 A1 | 3/2003 | Schmidt | |
| 2005/0078616 A1 | 4/2005 | Nevo et al. | |
| 2005/0130687 A1 | 6/2005 | Filipovic et al. | |

OTHER PUBLICATIONS

U.S. Appl. No. 60/238,761.

* cited by examiner

*Primary Examiner*—Chi Pham
*Assistant Examiner*—Alexander O. Boakye
(74) *Attorney, Agent, or Firm*—Knobbe, Martens, Olson & Bear, LLP

(57) ABSTRACT

Wireless communication networks utilize various communication protocols to exchange data between wireless network devices. Overlapping communication frequencies between data exchange protocols present a collision problem when data transmissions interfere with one another during wireless transit. A device for moderating transmission traffic in a wireless network where overlapping communication frequencies coexist is described to reduce or avoid interference caused by signal collisions.

34 Claims, 6 Drawing Sheets

REMOTELY-COOPERATIVE SCHEDULING SOLUTION FOR MODERATING WIRELESS PROTOCOLS

CLAIM OF PRIORITY

This U.S. patent application claims priority to U.S. Provisional Patent Application No. 60/336,339, entitled "Remotely-Cooperative Scheduling Solution for Moderating Wireless Protocols" filed Oct. 18, 2001, which is hereby incorporated by reference in its entirety. This U.S. patent application also claims priority to U.S. Provisional Patent Application No. 60/367,663, entitled "Remotely-Cooperative Scheduling Solution for Moderating Wireless Protocols" filed Mar. 22, 2002, which is hereby incorporated by reference in its entirety. Additionally, this application incorporates by reference in their entirety the following co-pending applications: U.S. patent application Ser. No. 10/003,703, filed Oct. 23, 2001, entitled "Coordination Architecture For Wireless Communication Devices Using Multiple Protocols", U.S. patent application Ser. No. 10/053,860, filed Oct. 25, 2001, entitled "Collision Rectification In Wireless Communication Devices", U.S. patent application Ser. No. 10/066,284, filed Feb. 1, 2002, entitled "Centralized Coordination Point For Wireless Communication Devices Using Multiple Protocols", U.S. patent application Ser. No. 10/106,515, filed Mar. 22, 2002, entitled "Top-Level Controller For Wireless Communication Devices and Protocols", and U.S. Patent Application No. 60/328,882, filed Oct. 11, 2001, and U.S. Patent Application No. 60/367,664, filed Mar. 22, 2002, entitled "Recognition Scheme For Moderating Wireless Protocols".

BACKGROUND OF THE INVENTION

1. Field of the Invention

The present invention relates to wireless networking systems and, in particular, to a coexistive solution for frequency-overlapping wireless communication protocols.

2. Description of the Related Art

Wireless communication and networking protocols are increasingly used to provide connectivity for diverse classes of electronic devices. These wireless protocols permit electronic devices such as computers, personal digital assistants (PDA), and mobile phones to transmit and receive information without the requirement of physically interconnecting the electronic devices to one another or to communications mediums via wire or cable connections. Wireless connectivity in this manner increases portability and flexibility in electronic devices and has become an important method by which data and information is distributed.

Numerous standards have been proposed for use in transmitting and receiving information in wireless local area networks. Two emerging protocols which have received widespread acceptance include Bluetooth (BT) and IEEE 802.11 (WLAN) wireless protocols. These protocols share a common frequency spectrum in the 2.4-GHz Industrial, Scientific, and Medical (ISM) band and are used to exchange information between electronic devices which support the appropriate protocol. Both protocols offer high speed data exchange rates and may be integrated into devices for connecting to land-based or wired communications networks such as the Internet. In general, wireless protocols, such as BT and WLAN, transmit data by superimposing the desired information on a carrier radio wave. Data is recovered through the use of a receiver which specifically tunes to the transmission frequency of the carrier signal to receive the signal and decode the information contained therein.

The Bluetooth protocol is designed primarily for short-range wireless communication between electronic devices in small localized networks (piconets). The network topology in the Bluetooth piconet comprises up to eight active devices, with a maximum of three synchronous-connection-oriented (SCO) links. These SCO links further support real-time communications such as those required for voice or telephony applications. The Bluetooth protocol additionally supports asynchronous connection links (ACL) which are typically used to exchange data and information in non-time critical applications. Within the piconet topology, only one Bluetooth device may typically transmit at a time, and transmissions are managed using a master/slave relationship. One Bluetooth device is designated as a master device and controls other slave device transmissions within the piconet. The master device coordinates transmissions within the piconet by continually polling the slave devices to determine which slave devices require a clear channel to transmit data. Slave devices receive "permission" from the master device before transmitting information and only transmit information when "asked" to do so by the master device. Controlling slave transmission traffic in this manner permits the master device to schedule and manage information exchange within the piconet and prevents data collisions and corruption due to overlapping data transmissions from multiple devices.

Bluetooth device communication can be further characterized by the use of a frequency-hopping spread spectrum (FHSS) technique. With the FHSS technique, data is transmitted in discrete packets along different frequencies within the 2.4-GHz ISM band. The Bluetooth protocol specifies that frequency hops be made at the rate of approximately 1600 hops/sec such that data exchange takes place with the data spread throughout the ISM band. This type of spread spectrum (SS) technique utilizes a relatively high energy transmission along a narrow band for a limited time.

Alternatively, the WLAN wireless protocols may be used to connect electronic devices in a peer-to-peer network. With the peer-to-peer type of network, there are no strict servers or hierarchy among communicating devices. In this network topology, each electronic device within the wireless network functions as its own server and determines when to send and receive information without a dedicated administrative server or master device. Devices in the WLAN wireless network contend for access to the available radio frequencies and bandwidth using a sensing and collision avoidance protocol to improve the rate of data and information transmission.

WLAN device communication can be further characterized by the use of a direct-sequence spread spectrum (DSSS). In a DSSS communication environment, data is transmitted along a wide bandwidth with relatively low energy. Typically, DSSS divides the available ISM band into eleven to fourteen sub-channels for different countries over the world. Each DSSS network will use a band of several channels centered at one of these standard sub-channels. In a multiple access-area network, overlapping and/or adjacent areas using different channels can operate simultaneously without interference if the distance between the center frequencies is at least 30 MHz. WLAN protocols occupy these fixed channels of the ISM band, (passbands), to transmit and receive information between compatible devices.

While the aforementioned wireless protocols function well in environments where only one wireless protocol in the ISM band is in operation, a problem arises in local area networks where Bluetooth and WLAN devices coexist. The shared frequency range of the two protocols inevitably results in transmission interference and data corruption as the two protocols operate with transmission frequencies that overlap at various times during routine transmission of information. The resulting frequency overlap degrades the network performance and transmission rates in both families of devices due to a lack of ability of wireless devices which use differing protocols to coordinate their data transmissions. This problem is exacerbated as the number of wireless devices within the network increases and is further affected by the proximity in which the wireless devices are placed with respect to one another. Thus, in order to prevent undue network performance degradation, a compensation scheme must be devised to facilitate the coexistence of shared frequency network topologies such as those used by BT and WLAN protocols.

The widespread acceptance of both the Bluetooth and WLAN wireless protocols has further lead to the manufacture of a large number of electronic devices which typically incorporate only a single wireless technology or protocol for network communication. This creates an additional problem as there are many existing wireless networks which necessarily dictate the type of wireless protocol which can be used within the network or in the vicinity of those devices in the network. Wireless devices which do not comply with the protocol of the existing wireless network may be incompatible with the network and may be precluded from use. Thus, a user may be denied access to wireless devices which cannot be integrated into the existing wireless network infrastructure because of conflicting wireless standards. In the absence of a unifying device which permits the use of more than one wireless standard in the same service area, existing wireless devices in the network may be required to be replaced with updated devices which are capable of communicating using multiple wireless standards to prevent timing and data collisions. Clearly, device replacement in this manner is undesirable as it may be prohibitively expensive and preclude the use of wireless devices which operate with differing frequency-overlapping protocols.

Currently, coexistive methods and mechanisms are difficult to implement due to the requirement of using a wired back haul device or a dual mode radio with a special protocol. Additionally, interference and transmission collision between frequency competing protocols can be significant, and, therefore, coexistive systems are not easily implemented in current wireless local area networks that utilize a plurality of protocols. For example, a current collision avoidance method reduces collision interference by isolating competing protocols into separately designated access areas. Although isolating frequency-overlapping protocols may reduce collision interference, the convenience of using the wireless network access area diminishes due to a reduced wireless network transmission range.

Based on the foregoing, a need exists for a system to facilitate the coexistence of wireless devices which operate with different frequency-overlapping protocols such as the Bluetooth and WLAN wireless protocols. A desirable feature of such a system is to permit the use of existing wireless devices without substantial modification. Furthermore, this system should manage cross-protocol trafficking to reduce collisions and interference between the wireless protocols using mixed topologies so as to permit wireless devices with differing protocols to function within the same transmission area.

SUMMARY OF THE INVENTION

The aforementioned needs may be satisfied by a communications network system, wherein wireless data exchange protocols comprising a first protocol and a second protocol operate using overlapping communication frequencies. In one embodiment, the communications network system comprises a local timing map generator that may be configured to acquire transmission timing characteristics of local wireless communication devices, track local transmissions, and generate a local timing map, a global timing map generator that may be configured to acquire the local timing map, track global transmissions, and generate a global timing map, and a traffic coordination component that may be configured to use the global timing map to reduce frequency-overlapping collisions by scheduling transmission sequences in a manner so as to avoid collisions in data exchange using the first protocol and the second protocol. In one aspect, the local timing map and the global timing map comprise periods of transmission availability, wherein transmissions may be scheduled by the traffic coordination component to avoid collisions. The windows of transmission availability may be created by moderating the first or the second protocol. Moderation of the first or the second protocol may be accomplished using a jamming signal which transiently delays or defers the transmission of the first or the second protocol.

Additionally, the local timing map generator monitors transmission timing characteristics of local wireless communication devices that are nearby and generates a local timing map indicative thereof. Acquiring transmission timing characteristics further comprises identifying one or more transmission traffic types within the wireless data exchange protocols and determining one or more quality of service parameters for the one or more transmission traffic types. The one or more quality of service parameters are used by the global timing map generator to assist in the generation of the global timing map. The one or more quality of service parameters are used by the local timing map generator to assist in the generation of the local timing map. The one or more transmission traffic types comprise a voice quality traffic type and a data quality traffic type. Scheduling transmissions comprises dynamically prioritizing the transmission traffic types based on the acquired transmission timing characteristics. The wireless data exchange protocols further comprise prioritizing the transmission traffic types based on predetermined levels of quality of service.

Moreover, the local timing map and the global timing map comprise masked domains indicative of regions of transient unavailability, wherein further transmission scheduling within the masked domains may be avoided to inhibit collisions. The local timing map generator monitors the transmission activity in a Bluetooth piconet and generates the local timing map indicative thereof. The global timing map generator monitors the transmission activity in a wireless local area network (WLAN) operating in an overlapping transmission area used by the Bluetooth piconet. The local timing map generator comprises a WLAN station, which further acts as a master for the Bluetooth piconet, wherein the master controls upstream and downstream data exchange between wireless communication devices within the Bluetooth piconet. The global timing map generator comprises an access point which exchanges data with the WLAN station. The access point connects the WLAN to a backbone network, which links the wireless communication network to the backbone network.

Furthermore, the first and second protocols are frequency-hopping spread spectrum protocols or direct-sequence spread spectrum protocols. The first and second protocols are Bluetooth protocols or WLAN protocols. The local timing map generator and the global timing map generator are used in conjunction with a plurality of wireless communication devices which operate using a least one of the plurality of data exchange protocols such that the local and global timing map generators moderate the traffic flow between the wireless communication devices to reduce data collisions and improve data throughput.

In another embodiment, the aforementioned needs may be satisfied by a coordination system for a wireless communication network in which a plurality of signal transmissions obtained from a first protocol and a second protocol operate using overlapping communication frequencies. In one aspect, the coordination system may comprise at least one slave station, which receives and transmits data in at least one of the protocols and at least one monitoring station, which monitors transmissions of the at least one slave station and generates a local timing map by acquiring transmission timing characteristics of the at least one slave station and tracking of the at least one slave station transmission sequences, the local timing map further indicating windows of transmission availability and masked regions of transmission unavailability. The coordination system may further comprise a coordinative access point, which acquires the local timing map, tracks global transmission sequences, and generates a global timing map to moderate transmissions in the wireless communication network to reduce collisions by scheduling global transmissions within the windows of transmission availability indicated by the local timing map.

Additionally, the at least one slave station may comprise a wireless communication device that uses a frequency-hopping spread spectrum protocol or a direct-sequence spread spectrum protocol. The at least one monitoring station may comprise a wireless communication device that monitors transmissions of at least one slave station using a frequency-hopping spread spectrum protocol or a direct-sequence spread spectrum protocol. The at least one monitoring station further possesses functionality to act as a master device capable of moderating transmissions of the at least one slave station. The at least one monitoring station may comprise a wireless communication device which operates using a frequency-hopping spread spectrum protocol and a direct-sequence spread spectrum protocol. The coordinative access point may comprise a wireless communication device that monitors and coordinates transmissions of the at least one monitoring station using a frequency-hopping spread spectrum protocol or a direct-sequence spread spectrum protocol. The coordinative access point asserts busy on the wireless communication network to reduce collisions.

In still another embodiment, the aforementioned needs may be satisfied by a coordination system for a wireless communication network in which a plurality of wireless communication devices transfer information using at least one of a first frequency-overlapping communication protocol and a second frequency-overlapping communication protocol. In one aspect, the system may comprise a global access area comprising at least one local access area, wherein the local access area comprises at least one wireless communication device and a local coordination device, which monitors the transmissions in the at least one local access area and generates at least one local timing map indicative thereof. The coordination system may further comprise a global coordination device, which receives the at least one local timing map and generates a global timing map indicative thereof, wherein the global timing map may be used to coordinate transmissions in the global access area and to reduce collisions in the wireless communication network by scheduling the transfer of information between the plurality of wireless communication devices.

In yet another embodiment, the aforementioned needs may be satisfied by a coordination system for a wireless communication network in which a first plurality of communication devices using a first protocol and a second plurality of communication devices using a second protocol exchange frequency-overlapping transmission signals. In one aspect, the coordination system may comprise a global network comprising a plurality of local networks and a plurality of local timing map generators, wherein each of the plurality of local networks comprises at least one of the plurality of local timing map generators, and wherein the at least one local timing map generator monitors the transmission signals in at least one of the plurality of local networks and generates at least one local timing map indicative thereof. In addition, the coordination system may further comprise a global timing map generator, which receives one or more of the plurality of local timing maps and generates a global timing map indicative thereof, wherein the global timing map may be used to coordinate frequency-overlapping transmission signals in the global network to reduce collisions in the wireless communication network by scheduling the transfer of information between the plurality of wireless communication devices.

Additionally, the global timing map generator may produce a timing mask for one or more of the plurality of local networks, wherein the timing mask identifies a timing sequence of the frequency-overlapping transmission signals in the wireless communication network. The timing mask may comprise one or more available time periods in which the global timing map generator schedules the transfer of information between the plurality of wireless communication devices to reduce collisions in the wireless communication network. The global timing map generator may manage a plurality of timing masks for scheduling the transfer of information between the plurality of wireless communication devices to reduce collisions in the wireless communication network.

In still yet another embodiment, the aforementioned needs may be satisfied by a system for resolving collisions between wireless communication nodes which send and receive data using one or more frequency overlapping protocols. In one aspect, the system may comprise a local monitoring station, which identifies the wireless exchange of information in at least one of the frequency-overlapping protocols in a local access area, wherein a plurality of local wireless network devices operate by exchanging information using at least one of the frequency-overlapping protocols, the local monitoring station further creating a timing map which indicates open regions of transmission availability. The system may further comprise a global access point, which receives the timing map and prioritizes the wireless exchange of information in at least one of the frequency-overlapping protocols to reduce data collisions by coordinating the exchange of information with the local monitoring station through the use of the timing map.

In still yet another embodiment, the aforementioned needs may be satisfied by a method of coordinating wireless communications between a first and a second wireless network of devices that broadcast transmission signals in overlapping frequency ranges. In one aspect, the method may comprise determining a first communication schedule for the first wireless network of devices and transmitting the first communication schedule to a control unit of the second wireless network of devices. In addition, the method may further comprise determining a second communication schedule for the second wireless network of devices, wherein the second communication schedule may be configured to be subordinate to the first communication schedule such that communications of the second wireless network of devices are not transmitted at times where the communications would overlap with the communications in the first wireless network of devices.

Moreover, determining the first communication schedule may comprise identifying periods of transmission availability where the second wireless network of devices may transmit in a non-conflicting manner with the first wireless network of devices and masked regions of transmission unavailability. Determining a first communication schedule may comprise determining a communication schedule for a frequency-hopping communication protocol used by the first wireless network of devices. Determining the first communication schedule may comprise determining a communication schedule for a Bluetooth protocol. Determining the second communication schedule may comprise determining a communication schedule for a WLAN protocol. Determining a second communication schedule may comprise determining a communication schedule for a direct sequence spread spectrum communication protocol that transmits at a frequency that overlaps with a frequency hopping communication protocol, wherein the second communication schedule inhibits broadcast of the spread spectrum communication protocol during broadcast of the frequency hopping communication protocol.

In still yet another embodiment, the aforementioned needs may be satisfied by a method of coordinating data transmissions in a wireless communication network in which wireless data exchange protocols comprising a first protocol and a second protocol operate using overlapping communication frequencies. In one aspect, the method may comprise recognizing at least one subset of local wireless communication devices so as to identify timing characteristics of the local wireless communication devices, generating a first timing map indicative of transmission characteristics of the at least one subset of local wireless communication devices so as to identify periods of transmission availability, and recognizing global wireless communication devices positioned outside of the at least one subset of local wireless communication devices so as to identify timing characteristics of the global wireless communication devices. Additionally, the method may further comprise using the first timing map to track corresponding data transmission sequences and periods of transmission availability and further scheduling data exchange in the global wireless communication devices during the periods of transmission availability so as to reduce collisions with the local wireless communication devices. These and other objects and advantages of the present invention will become more fully apparent from the following description taken in conjunction with the accompanying drawings.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals in which.

DETAILED DESCRIPTION OF THE PREFERRED EMBODIMENT

Although the following description exemplifies various embodiments of the present invention, it should be understood that omissions, substitutions, and changes in the form of the detail of the apparatus, system, and method as illustrated, as well as the uses thereof, may be made by those skilled in the art, without departing from the spirit of the present invention. Consequently, the scope of the present invention should not be limited to the disclosed embodiments, but should be defined by the appended claims. Reference will now be made to the drawings wherein like numerals refer to like parts throughout.

Figure 1A:
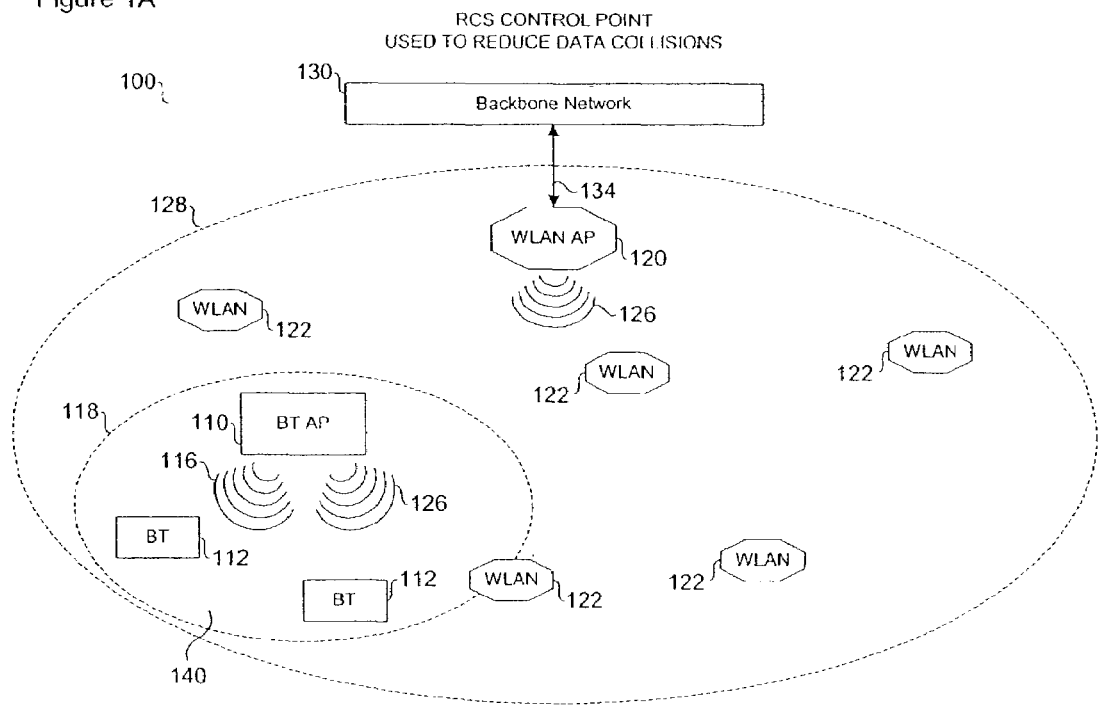
FIG. 1A illustrates one embodiment of a wireless communication network having overlapping transmission areas comprising a global access area, a local access area, and at least one access point device.

FIG. 1A illustrates one embodiment of a wireless communication network 100 with overlapping transmission access areas 118, 128 comprising a global access area 128 and a local access area 118. The global access area 128 comprises a global access point or global coordinating device 120. The local access area 118 comprises a local access point or local coordinating device 110. Within the wireless network 100, a plurality of wireless communication devices or data transfer terminals 112, 122 operate within the access areas 118, 128, wherein each access area 118, 128 may be characterized by a wireless signal reception radius, respectively. In addition, a plurality of wireless communication signals 116, 126 produced by the wireless communication devices 112, 122 may be received by other wireless communication devices 112, 122 within the same access area 118, 128.

As is further illustrated in FIG. 1A, in one embodiment, a local network of devices 112 utilize a first wireless communication protocol to exchange information with each other and the local access point 110 using a first plurality of wireless communication signals 116. The local devices 110, 112 share the local access area 118. Similarly, a global network of devices 122 utilize a second wireless communication protocol to exchange information with each other and the global access point 120 using a second plurality of wireless communication signals 126. The global devices 120, 122 share the global access area 128. In one aspect, the second access area 128 wholly overlaps the first access area 118 in a manner such that the transmission of the second plurality of communications signals 126 may interfere with the transmission of the first plurality of communication signals 116, which will be described in greater detail herein below. In another aspect, the access areas may partially overlap without departing from the scope of the present invention. It should be appreciated that the wireless communication devices 112, 122 may be configured to utilize a Bluetooth (BT) communication protocol and a Wireless Local Area Network (WLAN) communication protocol in the wireless network 100.

For illustrative purposes, the local network of wireless communication devices 112 operate using the first wireless protocol, such as the BT protocol, and the global network of wireless communication devices 122 operate using the second wireless protocol, such as the WLAN protocol. The nature of the wireless communication protocols is such that the wireless communication protocols operate in the wireless network 100 using at least a portion of the electromagnetic spectrum. It should be appreciated that the local and global network of wireless communication devices 112, 122 may use either the BT wireless communication protocol or the WLAN wireless communication protocol to transmit wireless communication signals 116, 126 without departing from the scope of the present invention.

In one embodiment, the local access area 118 represents a BT piconet, wherein the BT piconet may comprise a subset of one or more local wireless communication devices 112. The local coordinating device or local access point 110 may comprise and/or may be configured to function as a BT access point device (AP) and a BT master device. Therefore, the local access point 110, functioning as a BT master, coordinates and/or manages, in a supervisory manner, the exchange of local wireless communication signals 116 of the local network of devices 112 within the local access area 118.

Additionally, the global access area 128 represents a WLAN access area, wherein the WLAN access area may comprise a subset of one or more global wireless communication devices 122. The global coordinating device or second access point 120 may comprise and/or may be configured to function as a WLAN AP device and also as a gateway for the global network of wireless communication devices 122 to communicate with the backbone network 130 via a communication link 134. In one aspect, the WLAN AP device 120 coordinates and/or manages the exchange of global wireless communication signals 126 of the global network of devices 122 within the global access area 128. It should be appreciated that each global device 122 may have some distributed medium access control functions. In addition, the global network of devices 122 may interact with the backbone network 130 via the communication link 134 and the WLAN AP device 120. The backbone network 130 may include various information exchange networks, such as an Ethernet, an Intranet, and/or an Internet server or communications interface. Moreover, the communication link 134 may comprise various types of wireless communication links, hardwired communication links, or some combination thereof to facilitate the exchange of information between the WLAN wireless devices 122, the WLAN AP device 120, and the backbone network 130.

The IEEE 802.11 medium access control (MAC) provides functionality for a reliable mechanism capable of transmitting information and data over a wireless communication medium. In one aspect, information and data are integrated into a data packet, and the data packet may include a header file or other characteristic files. A typical header file comprises information that may include various packet transmission characteristics, such as packet data rates, packet lengths, packet timing characteristics, and packet transmission frequencies. In one embodiment, the local and global wireless communication signals 116, 126 comprise information packets as described herein.

FIG. 1A further illustrates an interference region 140 that may occur in each access area 118, 128, where wireless communication signal transmissions originating from the first frequency-overlapping protocol coexist with wireless communication signal transmissions originating from the second frequency-overlapping protocol. In one embodiment, the interference region 140 includes transmission regions where the first wireless signal reception radius 118 overlaps the second wireless signal reception radius 128. As previously discussed, the use of multiple frequency-overlapping protocols may result in transmission collision signals or interference when the protocols operate within the same vicinity of one another. As a result, transmission collisions between the frequency overlapping protocols are undesirable as they may result in data drop-offs, transmission errors, or slow downs in network traffic. In one aspect, frequency-overlapping wireless communication signals transmitted in this manner may produce one or more collision signals within the interference region 140. In one aspect, a collision signal is a signal in which a plurality of communication signals occupy the same frequency channel with respect to time. In addition, the collision signal may appear as some sort of a distortion signal, a transmission signal with modulated noise, or an error laden signal to the receiving wireless communication devices 110, 112, 120, 122.

It should be appreciated that collision signals may occur when a plurality of BT piconets coexist in overlapping piconets or local access areas. The discussion described herein may also be applied to networks comprising a plurality of overlapping BT piconets as well as a plurality of overlapping WLAN-BT access areas without departing from the scope of the present invention. It should also be appreciated that, although the access areas 118, 128 illustrated in FIG. 1 are shown to wholly overlap, the access areas 118, 128 may also partially overlap. Moreover, the communication devices 112, 122, that may use one or more frequency-overlapping protocols may be positioned in proximity to one another such that the access area for the frequency-overlapping protocols exists in the same spatial locality (i.e. access areas defined by identical or concentric spatial regions).

Furthermore, it should also be appreciated that the wireless communication devices 112, 122 may be positioned and/or re-positioned within the access areas 118, 128 such that only a portion of the devices 112, 122 reside in the interference area 140 where the communication protocols partially or wholly overlap. However, the presence of any wireless communication device 112, 122 within the region of overlap may be sufficient for creating interference and/or collision signals between the frequency-overlapping protocols.

Figure 1B:
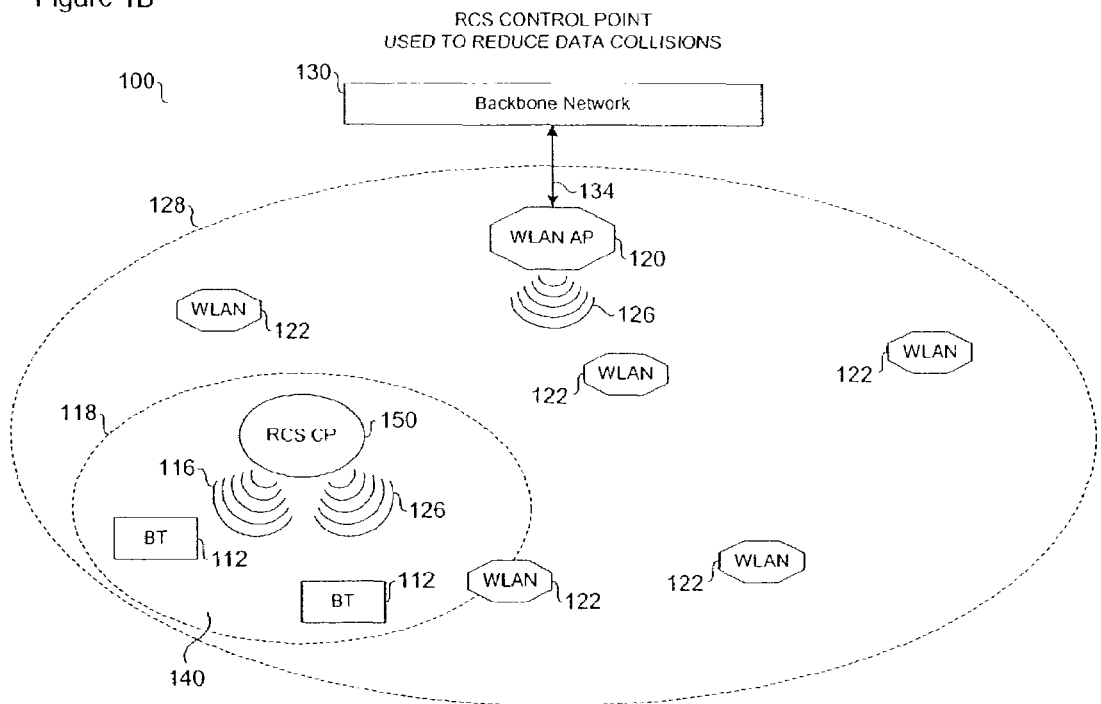
FIG. 1B illustrates the wireless communication network in FIG. 1A with the insertion of a remotely-cooperative scheduling control point device in the local access area.

FIG. 1B illustrates the wireless communication network 100 in FIG. 1A with the insertion of a data collision rectification device or a remotely-cooperative scheduling (RCS) control point (CP) device 150 in the local access area 118. As previously described, the global access area 128 comprises the local access area 118 in a manner such that the interference region 140 comprises the access area 118. As is illustrated in FIG. 1B, the RCS CP device 150 replaces the BT AP device 110, as illustrated in FIG. 1A, within the wireless network 100 and permits the coexistence of the above mentioned frequency-overlapping protocols in the wireless network 100. Furthermore, the RCS CP device 150 functions as a wireless signal transmission supervisor or controller for at least one of the frequency-overlapping protocols, such as the Bluetooth protocol, to prioritize and schedule the exchange of local signals 116 so as to permit uncorrupted data transmissions in the overlying access areas 118, 128.

In one aspect, the RCS CP device 150 is implemented to reduce packet collisions and moderate signal interference between the first and the second frequency-overlapping protocols. Furthermore, the RCS CP device 150 may be configured with the capability of monitoring, moderating, and/or coordinating the transmission characteristics of at least one of the wireless communication signals 116, 126 for the purpose of maintaining the quality of service parameters for at least one of the protocols in a manner that will be discussed in greater detail herein below. In this particular embodiment, the RCS CP device 150 functions as a BT master in the local access area 118. In addition, the RCS CP device 150 preferably comprises WLAN functionality such that the RCS CP device 150 is recognized by the global network devices 120, 122 as a valid WLAN device that is capable of receiving and transmitting WLAN encoded communication signals 126 within the wireless network 100. Therefore, the WLAN AP device 120 recognizes the RCS CP device 150, including the piconet devices 112, as a single WLAN device or entity.

In one aspect, the moderation of data exchange by the RCS CP device 150 may be accomplished by synchronizing the timing of communication signals in a manner such that transmission overlap of one or more communication signals within the same frequency and/or timing channel is avoided. The RCS CP device 150 may further determine a desirable ordering of the communication signals to be transmitted within the wireless network 100 and influence the transmission of the communication signals in either frequency overlapping protocol or a combination thereof so as to achieve a reduced number of collision signals. As previously described, interference and/or collision signals result from the simultaneous transmission of at least two frequency-overlapping communication signals that may occupy or share the same frequency channel and/or temporal region.

In addition, the RCS CP device 150 may determine the ordering of the communication signals by acquiring timing information from previously transmitted data packets, as well as, timing information from data packets that are currently being transmitted. The RCS CP device 150 may further receive transmission characteristics, including timing information, in a collision monitoring process to reduce interference and data corruption resulting from simultaneous transmission of data packets using either of the frequency overlapping protocols or a combination thereof.

Advantageously, the RCS CP device 150 may be implemented as an independent or stand-alone device. One desirable feature of the independent RCS CP device 150 is that it may be conveniently positioned within an existing wireless communications network 100 to improve data exchange and throughput in the wireless network 100 without substantial or significant modification of the existing network. For example, the independent RCS CP device 150 may be configured to moderate wireless communication signals 116, 126 between the frequency-overlapping wireless protocols in a manner which does not require other communication devices 112, 122 within the network 100 to be modified, repositioned, or replaced. As a result, the independent RCS CP device 150 may substantially reduce the potential costs associated with modifying, repositioning, and/or replacing existing wireless communication devices 112, 122 with dual functionality wireless devices. As a result, this feature of the independent RCS CP device 150 increases the flexibility, functionality, and/or stability of the wireless network 100 and the operation of the associated wireless communication devices 112, 122 within the wireless network 100.

Figure 1C:
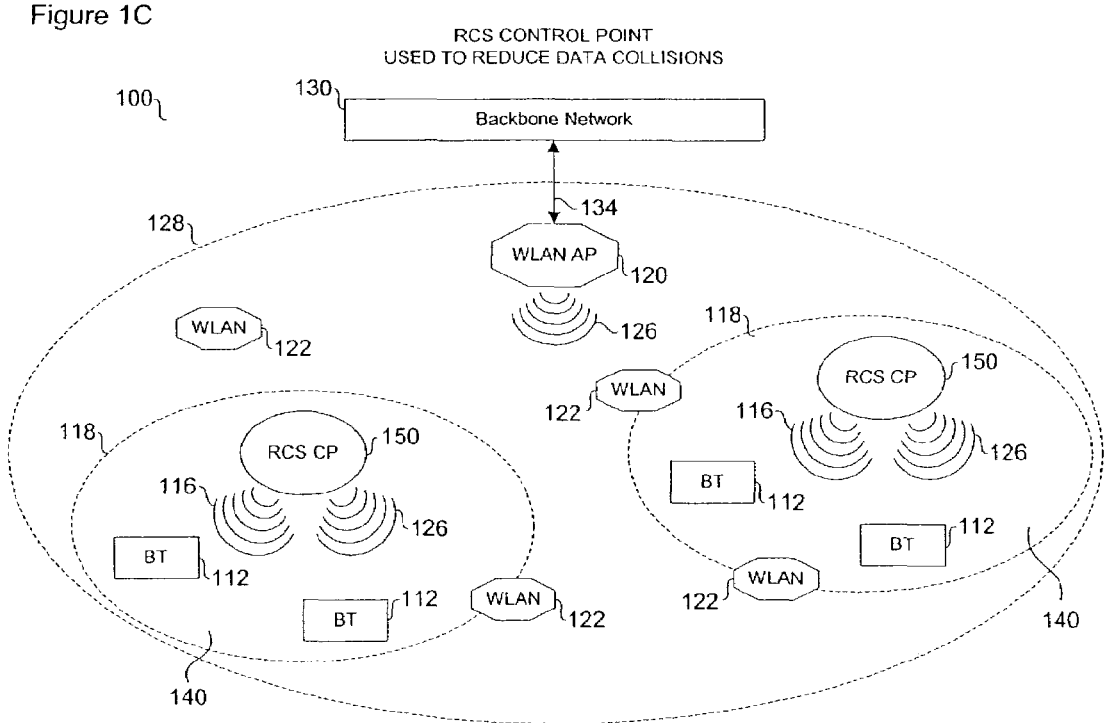
FIG. 1C illustrates the wireless communication network in FIGS. 1A, 1B having overlapping transmission areas comprising a global access area and a plurality of local access areas each having a remotely-cooperative scheduling control point device.

FIG. 1C illustrates the wireless network 100 in FIGS. 1A, 1B with a plurality of overlapping transmission areas 118, 128 comprising a global access area 128 and a plurality of local access areas 118. The plurality of overlapping local and global access areas 118, 128 produce a plurality of interference regions 140. In this particular embodiment, the insertion of a plurality of RCS CP devices 150 may be necessary to coordinate the signal traffic between the wireless communication devices 112, 122. As previously described, the RCS CP devices 150 preferably comprise WLAN functionality such that the RCS CP devices 150 are recognized by the global network devices 120, 122 as valid WLAN devices that are capable of receiving and transmitting WLAN communication signals 126 within the wireless network 100. Therefore, the WLAN AP device 120 recognizes the RCS CP devices 150, including their piconet devices 112, as WLAN stations or entities. It should be appreciated that the wireless network 100 may comprise various network configurations and/or topologies as described in the Applicant's co-pending U.S. patent application Ser. No. 10/106,515 entitled "TOP-LEVEL CONTROLLER FOR WIRELESS COMMUNICATION DEVICES AND PROTOCOLS", which is hereby incorporated by reference in its entirety.

Figure 2A:
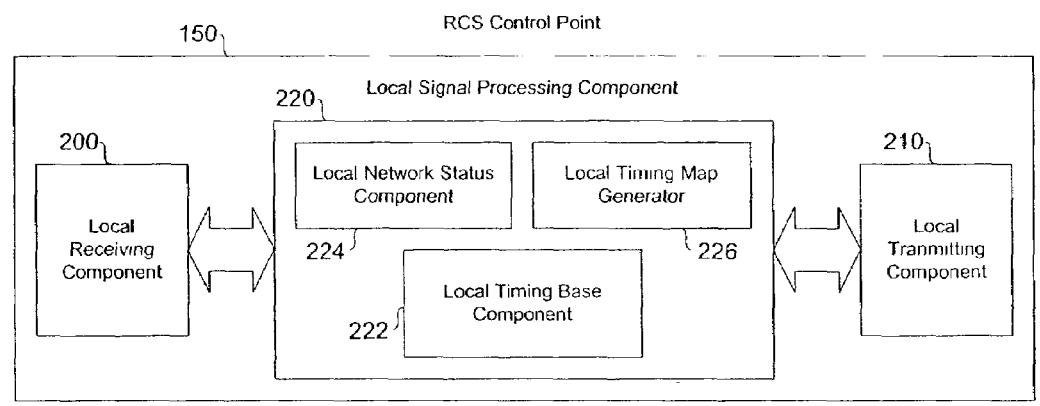
FIG. 2A illustrates a block diagram of one embodiment of the remotely-cooperative scheduling control point device in FIGS. 1B, 1C.

FIG. 2A illustrates one embodiment of the RCS CP device 150 architecture utilized to monitor, moderate, and/or coordinate wireless communication signal traffic in the wireless network 100. The RCS CP device 150 comprises a local receiving component 200, a local transmitting component 210, and a local signal processing component 220. The components 200, 210, 220 are preferably configured to work independent of the wireless network devices 112, 122, which utilize the frequency-overlapping protocols in the wireless network 100.

In one embodiment, the local receiving component 200 may be configured to monitor the wireless communication signal traffic in the wireless network 100, and receive the wireless communication signals 116, 126 where the frequency-overlapping protocols are in use. The wireless communication signals 116, 126 may comprise data packets, which provide the medium for data exchange between the wireless communication devices 112, 122. The use and functionality of the data packet will be discussed in greater detail herein below.

In addition, the local receiving component 200 may comprise dual functionality including the capability to receive and demodulate/decode WLAN and BT data packets. Moreover, the local receiving component 200 may further comprise the functional capability to provide the local signal processing component 220 with the received and demodulated/decoded WLAN and BT data and information. In another embodiment, the local receiving component 200 may comprise the capability to receive a collision signal and/or a plurality thereof. When both WLAN and BT signals arrive at the local receiving component 200 at comparable power levels, the signal may be separated in a manner as described in the Applicant's co-pending U.S. patent application Ser. No. 62/328,882 entitled "Recognition Scheme For Moderating Wireless Protocols", which is hereby incorporated by reference in its entirety. In this particular embodiment, the BT and/or WLAN implementation should include the ability to control the remote sending power in a manner such that the BT and WLAN power may arrive at the receiving device at nominal strength. If dual reception is performed, the time for the overlapping packets may not be excluded from the available receiving time. Advantageously, this particular embodiment may lead to better network throughput performance.

In one embodiment, the local transmitting component 210 may be configured to transmit data packets in at least one of the frequency-overlapping protocols such that the local transmitting component 210 preferably comprises dual functionality including the capability to modulate/encode and transmit WLAN and BT packets within the access areas 118, 128 including the interference regions 140. Additionally, the local transmitting component 210 may be further configured with the capability to accept commands and transmission data from the local signal processing component 220.

In one embodiment, the local signal processing component 220 comprises a local timing base component 222, a local network status component 224, and a local timing map generator 226. The local signal processing component 220 may use the local timing base component 222 to establish the local timing parameters for the local access area 118. The local timing parameters may be used to schedule and prioritize the packet transmissions of the communication signals 116. In addition, the local signal processing component 220 may use the local network status component 224 to identify and list active device connections in the access area 118. The active device connections may be accompanied by significance coefficients, which may represent the degree of interference the active device connections may impose onto the wireless network 100. Furthermore, the local signal processing component 220 may use the timing parameters and the list of active device connections to produce and define a local timing map using the local timing map generator 226. In one aspect, the local timing map may be sent to the WLAN AP device 120 so that the WLAN AP device 120 may schedule and prioritize the transmission of the local communication signals 116 with the transmission of the global communication signals 126. The scope and functionality of the local timing map will be described in greater detail herein below with reference to FIG. 3B.

The IEEE 802.11 medium access control (MAC) provides functionality for a reliable mechanism capable of transmitting data over a wireless communication medium. In one embodiment, data and information are framed into a packet, and the packet includes a header file. A typical header file comprises necessary transmission information that may include data packet transmission characteristics, such as the packet data rate, the packet length, the packet timing, and the packet transmission frequency channel. Furthermore, the data packet transmission characteristics may be used by the local signal processing component 220 to schedule and prioritize packet transmissions within the wireless network 100.

In addition, the local signal processing component 220 may further be configured to control the local receiving component 200 and the local transmitting component 210. The local signal processing component 220 may be configured to accept decoded data from the local receiving component 200, determine the transmission protocol type, and extract header information that may be present in the data transmission of the received wireless communication signal.

Moreover, the local signal processing component 220 may comprise the capability to prioritize and schedule the local communication signals 116 in the wireless network 100 to reduce collisions between frequency-overlapping protocols. The local signal processing component 220 may further be configured to formulate transmission traffic coordination decisions based on pre-determined criteria. As previously described, the coordination of data transmissions in the access areas 118, 128 allows for the coexistence of a plurality of frequency-overlapping protocols, such as WLAN and BT protocols.

Since the RCS CP device 150 functions as a BT master device, the RCS CP device 150 preferably controls the packet transmission timing of the local communication signals 116. Therefore, in one embodiment, the local signal processing component 220 may further comprise the capability of controlling the packet transmission timing in a manner so as to reduce the occurrence of interference and collision signals in the wireless network 100. To accomplish this task, the local signal processing component 220 evaluates the packet timing characteristics of previously transmitted communication signals 116 and generates a local timing map that summarizes or defines the packet timing characteristics, including the packet frequency channel, used to transmit the local communication signals 116. Once the local timing map is generated by the local timing map generator 226, then the local signal processing component 220 may transfer the local timing map to the WLAN AP device 120 so that the WLAN AP device 120 may prioritize, schedule, and coordinate the transmission of the local communication signals 116 with the transmission of the global communication signals 126 in a manner so as to reduce communication signal interference. As previously mentioned, the scope and functionality of the local timing map will be further described in greater detail herein below with reference to FIG. 3B.

Advantageously, the RCS CP device 150 is deployed in a multiple station access area in a wireless network similar to the wireless network 100. In one aspect, the RCS CP device 150 may comprise a modified BT unit and a modified WLAN unit. The RCS CP device 150 may be positioned among standard wireless communication devices in a wireless network where the heaviest BT transmission traffic is likely to occur. The advantage of this network architecture is that the pre-existing wireless communication devices 112, 120, 122 in the wireless network 100 may remain unchanged and unmodified. Through the use and addition of at least one RCS CP device 150 in the wireless network 100, an improvement in wireless transmission performance and throughput may be achieved by prioritizing and scheduling the wireless communication signals in a non-conflicting manner.

Figure 2B:
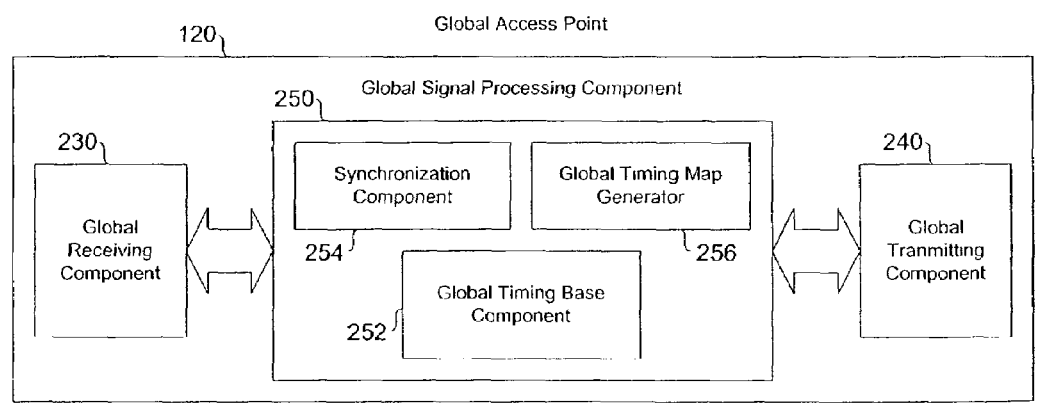
FIG. 2B illustrates a block diagram of one embodiment of the at least one access point device as referenced in FIGS. 1A–1C.

FIG. 2B illustrates one embodiment of a block diagram of the WLAN AP device 120 architecture utilized to monitor, moderate, and/or coordinate wireless communication signal traffic in the wireless network 100. Similar to the RCS CP device 150, the WLAN AP device 120 comprises a global receiving component 230, a global transmitting component 240, and a global signal processing component 250. In addition, the components 230, 240, 250 are preferably configured to work independent of the wireless network devices 112, 122, which utilize the frequency-overlapping protocols in the wireless network 100.

In one embodiment, the global receiving component 230 may be configured to monitor the global transmission signal traffic in the wireless network 100, and receive the wireless communication signals 126 from the global network devices 122. As previously described, the wireless communication signals 126 may comprise data packets, which provide the medium for data exchange between the wireless communication devices 122. The use and functionality of the data packet will be discussed in greater detail herein below.

In addition, the global receiving component 230 may preferably comprise the capability and functionality to receive and demodulate/decode WLAN encoded data packets. Moreover, the global receiving component 230 may further comprise the functional capability to provide the global signal processing component 250 with the received and demodulated/decoded WLAN and BT data and information. In another embodiment, the WLAN AP device 120 may be modified to comprise BT functionality, wherein the WLAN AP device 120 further comprises the capability to receive and demodulate/decode BT encoded data packets. It should be appreciated that, since the local timing map is encoded as a WLAN signal, the global receiving component 230 is capable of receiving the local timing map, decoding the local timing map, and transferring the local timing map to the global signal processing component 250 for further processing in a manner that will be described in greater detail herein below.

In one embodiment, the global transmitting component 240 may be configured to transmit data packets in at least one of the frequency-overlapping protocols such that the global transmitting component 240 comprises singular functionality including the capability to modulate/encode and transmit WLAN encoded data packets within the access areas 118, 128 including the interference region 140. In another embodiment, the global transmitting component 240 may comprise dual functionality including the capability to modulate/encode and transmit WLAN and BT packets within the access areas 118, 128 including the interference regions 140. Additionally, the global transmitting component 240 may be further configured with the capability to accept commands and transmission data from the global signal processing component 250.

In one embodiment, the global signal processing component 250 comprises a global timing base component 252, a synchronization component 254, and a global timing map generator 256. The global signal processing component 250 may use the global timing base component 252 to establish the global timing parameters for the global access area 128. The global timing parameters may be used to schedule and prioritize the packet transmissions of at least one of the communication signals 116, 126. In addition, the global signal processing component 250 may use the synchronization component 254 to identify and list active device connections in the access areas 118, 128. Furthermore, the global signal processing component 250 may use the global timing parameters and the list of active device connections to produce and define a global timing map using the global timing map generator 256. In one aspect, the global timing map may be used by the WLAN AP device 120 to schedule and prioritize the transmission of the global communication signals 126 including the local communication signals 116. The scope and functionality of the global timing map will be described in greater detail herein below with reference to FIGS. 3B, 3C.

Additionally, the synchronization component 254 may be used by the global signal processing component 250 to synchronize the local timing map with the global timing map. The synchronization component 254 may use a time measurement unit and a timing offset unit to synchronize the packet transmission timing of the local communication signals 116 with the packet transmission timing of the global communication signals 126. By synchronizing the communication signals 116, 126 in the wireless network 100, the global signal processing component 250 may advantageously coordinate and moderate the local and global communication signals 116, 126 to substantially reduce the occurrence of interference and/or collision signals in the wireless network 100. The synchronization component 254 may also comprise a plurality of network queues corresponding to the plurality of local access areas 118 and the plurality of RCS CP devices 150 as illustrated in FIG. 1C. Moreover, the synchronizing component 254 may further comprise a global queuing component that may be used to identify the current packet to be transmitted from the plurality of network queues. It should be appreciated that the data packet transmission characteristics, such as the packet data rate, the packet length, the packet timing, and the packet transmission frequency channel, may be used by the global signal processing component 250 to schedule and prioritize local and global packet transmissions within the wireless network 100.

In addition, the global signal processing component 250 may further be configured to control the global receiving component 230 and the global transmitting component 240. The global signal processing component 250 may be configured to accept decoded data from the global receiving component 230, determine the transmission protocol type, and extract packet header information that may be present in the received wireless communication signal.

Furthermore, the global signal processing component 250 may comprise the capability to schedule the local and global communication signals 116, 126 in the wireless network 100 to reduce collisions between frequency-overlapping protocols. The local signal processing component 220 may further be configured to formulate transmission traffic coordination decisions based on pre-determined criteria. As previously described, the coordination of data transmissions in the access areas 118, 128 allows for the coexistence of a plurality of frequency-overlapping protocols, such as WLAN and BT protocols. Since the WLAN AP device 120 functions as a WLAN coordination device, the WLAN AP device 120 is capable of significantly preventing collisions between WLAN communication signals.

Therefore, in one embodiment, since the WLAN AP device 120 recognizes the RCS CP device 150 as a WLAN entity, the global signal processing component 250 may further comprise the capability of coordinating the packet transmission timing of the globally recognizable communication signals 116, 126 in a manner so as to reduce the occurrence of interference and collision signals in the wireless network 100. To accomplish this task, the global signal processing component 250 evaluates the packet timing characteristics of the local timing map and the previously transmitted communication signals 126 so as to generate a global timing map that summarizes or defines the packet timing characteristics used to transmit the local and global communication signals 116, 126. As previously mentioned, the scope and functionality of the local and global timing maps will be further described in greater detail herein below with reference to FIGS. 3B, 3C.

Advantageously, the RCS CP device 150 uses WLAN functionality to communicate with the WLAN AP device 120 so as to coordinate the packet transmission timing of the local communication signals 116 with the global communication signals 126. The advantage of this network architecture is that the pre-existing wireless communication devices 112, 120, 122 in the wireless network 100 may remain unchanged and unmodified. Through the use and addition of at least one RCS CP device 150 in the wireless network 100, an improvement in wireless transmission performance and throughput may be achieved by prioritizing and scheduling the wireless communication signals in a non-conflicting manner.

Figure 3A:
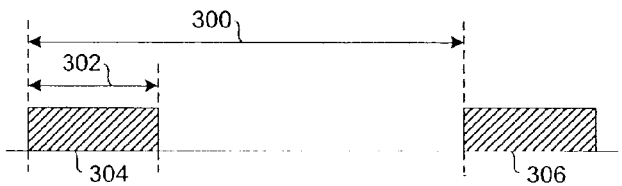
FIG. 3A illustrates one embodiment of a transmission cycle period having an occupied period.

FIG. 3A illustrates one embodiment of a transmission cycle period 300 having an occupied period 304. The occupied period may comprise a first information packet 304, which may be indicative of at least one of the transmitted WLAN or BT communication signals 116, 126. A second information packet 306 may be transmitted after the transmission cycle 300 has ended. It should be appreciated that a plurality of transmission cycles may sequentially repeat one after another so as to exchange information between wireless communication devices in the wireless network 100. It should also be appreciated that the length of the transmitted information packets may very in length depending on the amount of data or information transmitted without departing from the scope of the present invention.

Figure 3B:
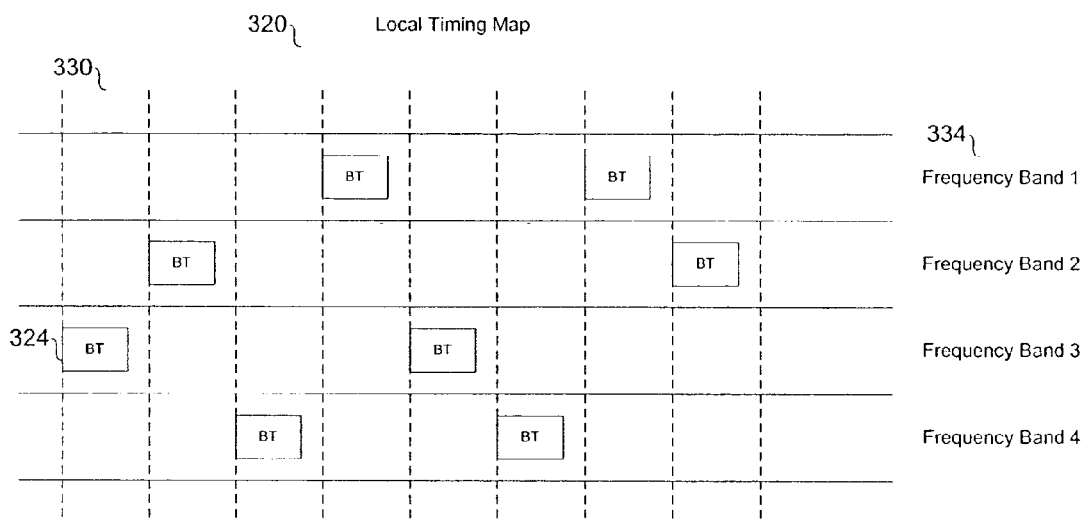
FIG. 3B illustrates one embodiment of a local timing map indicative of the transmission of a plurality of frequency-overlapping communication signals using at least one wireless communication protocol.

FIG. 3B illustrates one embodiment of a local timing map 320 indicative of the transmission of a plurality of local information packets 324 using the first plurality of communication signals 116 by the local wireless devices 112. In this particular embodiment, the local timing map 320 is used by the RCS CP device 150 to identify the temporal regions 330 of the transmission cycle periods and the frequency bands 334 in which the local information packets 324 are transmitted. As previously described, the BT protocol uses a frequency-hopping spread spectrum (FHSS) wireless communication protocol to transmit the local information packets 324. In one aspect, the pattern in which the local information packets 324 form may be defined as a first inband frequency mask, wherein the first inband frequency mask indicates and defines BT occupied transmission regions. A collision signal may be produced when two or more information packets 324 occupy the same position in the transmission cycle period within the first inband frequency mask. It should be appreciated that the order in which the frequency bands are chosen by the local devices 112, 150 may vary without departing from the scope of the present invention.

In one embodiment, the local signal processing component 220 of the RCS CP device 150, as referenced by FIG. 2A, prioritizes BT information packets by analyzing throughput service levels for BT transmissions within the piconet. The BT information packets may be sent at predetermined regular intervals in the clocked transmission cycle periods. Regular operations for BT protocol, except paging and inquiry, may be synchronized to a master clock, such as the local timing base component 222. In one aspect, the master clock may run at approximately 1600 cycles per second, and each clocked cycle may be referred to as a BT transmission cycle period. A clock cycle may comprise at least one or more transmission cycle periods without departing from the scope of the present invention.

Additionally, the RCS CP device 150, which functions as a BT master, may send downstream information packets in even numbered clocked cycles and the addressed local BT devices 112 may send upstream information packets in odd numbered clocked cycles. At each clock cycle, the frequency changes with a frequency-hopping sequence that is determined by the RCS CP device 150. The RCS CP device 150 initiates communication with local BT devices 112, and the local BT devices 112 may only transmit data packets when the RCS CP device 150 addresses a particular local BT device 112. Based on the foreknowledge of the transmission sequence of the information packets 324, the RCS CP device 150 generates the local timing map 320 so as to identify the first inband frequency mask. Once generated, the RCS CP device 150 transfers the local timing map 320 to the WLAN AP device 120 for further processing and evaluation in a manner that will be described in greater detail herein below with reference to FIG. 3C.

As previously discussed, a BT piconet has at least one master device and one or more slave devices, and BT transmissions involve at least two types of communication links: synchronous-connection-oriented (SCO) and asynchronous-connection-link (ACL). It should be appreciated that the SCO communication link is a non-deferrable data type, such as voice transmissions, and the ACL communication link is a deferrable data type, such as general application data transmissions. SCO information packets may comprise asynchronous data in addition to the synchronous data, and both ACL and SCO information packets may be the length of two, four, or six timing slots.

In one aspect, BT SCO links may constitute a significant interference to WLAN communication traffic. When a BT transmitter is in the same vicinity as the RCS CP device 150, the BT SCO signal interference may result in an unrecognizable communication signal due to signal saturation and shadowing of the WLAN signal. In this particular case, it may be preferable to mask out or drop the BT SCO occupied periods. In one aspect, a loss of 1% of SCO voice packets does not significantly degrade perceived voice quality. In addition, a 3% to 5% SCO voice packet loss may increase perceived noise, but the voice quality often remains acceptable and understandable. Therefore, if interference is likely to occur, then the RCS CP device 150 may elect to mask out or drop the transmission of an SCO packet to give priority to the reception of WLAN transmission traffic without severe degradation to the data quality of BT SCO transmission traffic. It should be appreciated that voice data types and SCO communication links are synchronous in nature, wherein the voice transmissions are time dependent transfers in a manner such that the voice data packets are non-deferrable.

In another aspect, when a BT transmitter is not in the same vicinity as the RCS CP device 150, then the BT SCO interference may only be the result of an inband WLAN collision. In this particular case, the BT SCO transmission cycle periods may be supplemented by the first inband frequency mask, which may further identify parameters for the masking of BT SCO occupied periods. These parameters may be represented in a plurality of designs. For one, the masked BT SCO occupied periods may be sent to the WLAN AP device 120 for a short effectiveness duration and regular updates to further facilitate the prioritizing and scheduling of the transmission of the global communication signals. Second, the masked BT SCO periods, the RCS CP device address, and timing values may be sent to the WLAN AP device 120 in a manner such that the WLAN AP device 120 may derive the first inband frequency mask. This information may only need to be sent one time and may be effective until the close of the particular BT SCO connection. The extra computational work would be done by the WLAN AP device 120.

In one embodiment, ACL link packets may be sent randomly in clocked transmission cycle periods. The RCS CP device 150 may transmit ACL packets in even numbered clock cycles, and the addressed local BT devices 112 may transmit ACL packets in the following clock cycle. ACL packets sent upstream or downstream may have a length and duration of approximately five clock cycles or timing slots. It should be appreciated that general application data types and ACL communication links are asynchronous in nature, wherein general data transmissions are time independent transfers in a manner such that the general application data packets are deferrable. ACL packets are used to convey general application data, which is asynchronous in character and is sensitive to loss but less so to delay. Therefore, ACL packets may be deferred so as to not interfere with the reception of WLAN information packets and communication signals.

In some circumstances, creating gaps between BT ACL packets may be necessary to allow WLAN packets to b transmitted. BT ACL links provide quality of service (QoS) parameters for each active connection. The QoS may require support in the baseband by agreement on the polling interval, maximal slot, token rate, peak bandwidth, channel latency, and other characteristics. The QoS may be used by the RCS CP device 150 to create gaps in between BT ACL packets transmissions. Other modes of operation, including the sniff mode and the parked mode, may be used to further facilitate the create of gaps between BT ACL packets transmissions. Advantageously, the RCS CO device 150 may coordinate piconet activity with the WLAN AP device 120 so as to avoid collisions.

Figure 3C:
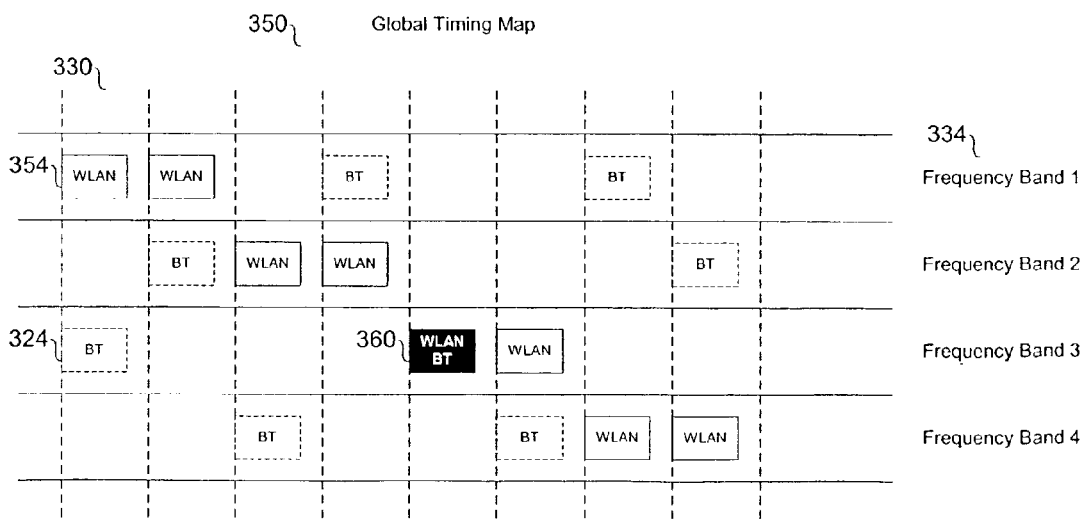
FIG. 3C illustrates one embodiment of a global timing map indicative of the simultaneous transmission of a plurality of frequency-overlapping communication signals using a plurality of wireless communication protocols.

FIG. 3C illustrates one embodiment of a global timing map 350 indicative of the simultaneous transmission of a plurality of frequency-overlapping communication signals 116, 126 using a plurality of wireless communication protocols, such as the WLAN and BT protocols. In this particular embodiment, the global timing map 350 is used by the WLAN AP device 120 to identify the temporal regions 330 of the transmission cycle periods and the frequency bands 334 in which the local information packets 324 and global information packets 354 are transmitted. As previously described, the WLAN protocol uses a direct-sequence spread spectrum (DSSS) wireless communication protocol to transmit the global information packets 354. In one aspect, the pattern in which the global information packets 354 form may be defined as a second inband frequency mask, wherein the second inband frequency mask indicates and defines WLAN occupied transmission regions. As previously described, a collision signal may be produced when two or more information packets 324, 354 occupy the same position in the transmission cycle period within the first or second inband frequency mask. It should be appreciated that the order in which the frequency bands are chosen by the global devices 122, 120 may vary without departing from the scope of the present invention.

In one embodiment, the first inband frequency mask is superimposed by the WLAN AP device 120 over the second inband frequency mask to generate the global timing map 350. The global signal processing component 250 of the WLAN AP device 120, as referenced by FIG. 2B, prioritizes WLAN information packets by analyzing throughput service levels for WLAN transmissions within the global access area 128 of the wireless network 100. The WLAN information packets may be sent at pre-determined regular intervals in the clocked transmission cycle periods. Regular operations for WLAN protocol, may be synchronized to a global master clock, such as the global timing base component 252. A clock cycle may comprise at least one or more transmission cycle periods without departing from the scope of the present invention.

If, after generating the global timing map 350, the WLAN AP device 120 determines that a collision signal 360 is imminent or likely to occur, then the WLAN AP device 120 may coordinate a collision avoidance procedure, such as asserting a busy on the air channel in a manner so as to delay the transmission of the WLAN information packet 354 at the point of collision 360 in favor of transmitting the BT information packet 324 at the point of collision 360. Various embodiments of this particular collision avoidance procedure are described in the Applicant's co-pending U.S. patent application Ser. No. 10/053,860 entitled "Collision Rectification In Wireless Communication Devices", which is hereby incorporated by reference in its entirety. It should be appreciated that the WLAN AP device 120 may be modified to work directly with the RCS CP device 150 to coordinate the transmission of communication signals 116, 126 in the wireless network 100 without departing from the scope of the present invention. It should also be appreciated that the RCS CP device 150 may be the only modified component in the communication system, and the RCS CP device 150 simply utilizes the parameters and characteristics of the WLAN protocol to communicate and coordinate transmission traffic with the WLAN CP device 120.

In one embodiment, the Applicant's co-pending U.S. Patent Application Ser. No. 10/053,860 describes a method of deferring data packets by utilizing a jamming signal. The jamming signal is based on the concept that, in access areas of a wireless network, individual stations of the WLAN protocol environment listen to an air channel for space availability prior to transmitting a WLAN data packet. If a busy signal is asserted by a WLAN access point, then the individual WLAN stations in the access area perceive the air channel as busy until a BT data packet is sent. In one aspect, the jamming signal is a signal or transmission that appears on the air channel to be of power or intensity in the WLAN band above a threshold at WLAN receiving stations. For example, in one embodiment, when the transmission energy of a WLAN packet is above a 100 mW threshold, the stations may wait for the transmission power to dip below 100 mW before listening to the air channel and receiving the data packet. This jamming signal is referred to as energy on air based upon the energy differential of the jamming signal. Various embodiments of jamming signals are described in greater detail in the Applicant's above-mentioned co-pending U.S. Patent Application Ser. No. 10/053,860.

Advantageously, the local timing map 320 and the global timing map 350 are used to identify imminent or likely collisions between the information packets 324, 354. When a possible collision is determined, collision avoidance procedures may be administered by the RCS CP device 150 and/or the WLAN AP device 120 to reduce the occurrence of collisions in the wireless network 100. The local and global timing maps 320, 350 are implemented as a mechanism to define and summarize the scheduled positions, with respect to time and frequency, of the transmitted information packets 324, 354. In addition, overlapping information packets 324, 354 are likely to be identified and collisions are likely to be avoided so as to increase the reliability and throughput of the wireless network 100 in a substantially efficient and effective manner.

Figure 4:
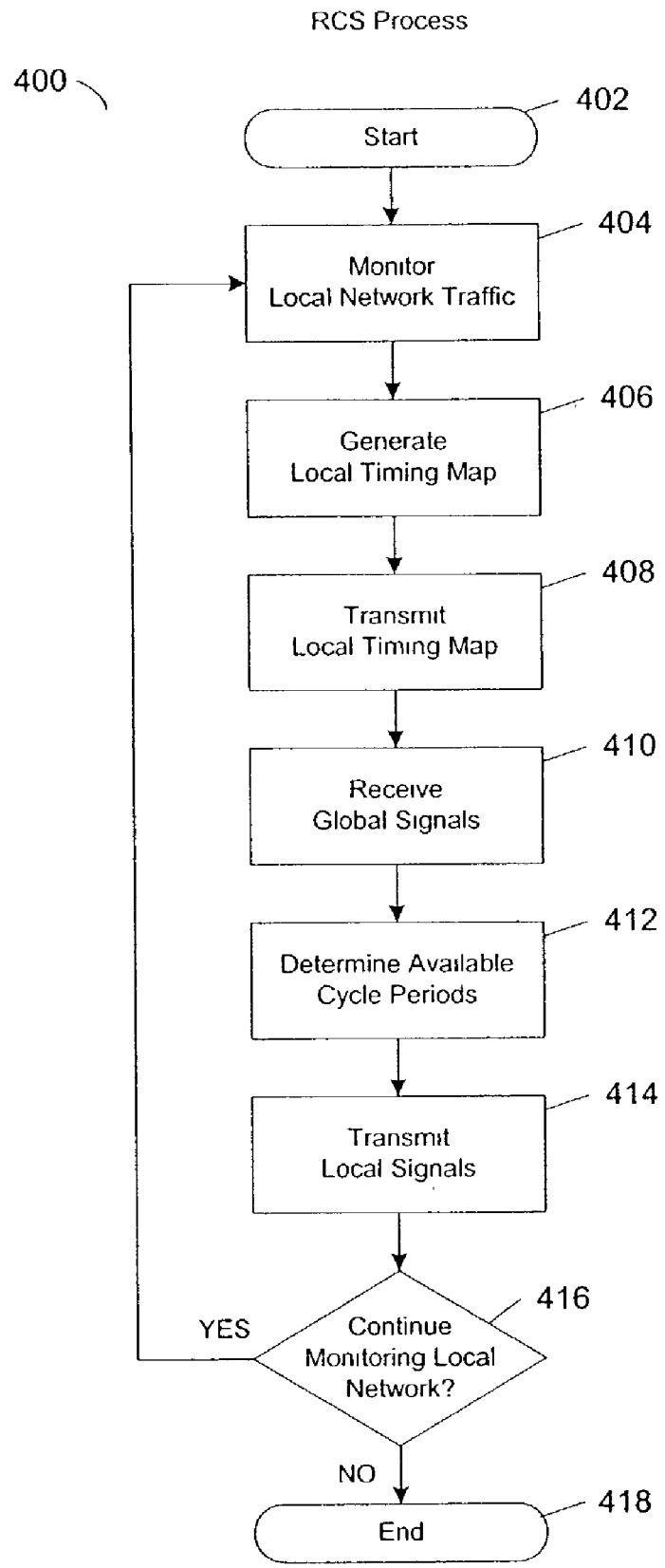
FIG. 4 illustrates one embodiment of a remotely-cooperative scheduling process, wherein the remotely-cooperative scheduling control point device of FIG. 2A generates the local timing map of FIG. 3B.

FIG. 4 illustrates one embodiment of a remotely-cooperative scheduling process 400, wherein the RCS CP device 150 of FIG. 2A generates the local timing map 320 of FIG. 3B. The remotely-cooperative scheduling process 400 commences in a start state 402 and then advances to a state 404, where the RCS CP device 150 monitors the local network traffic in the local access area 118 and receives transmission information indicative of previously and currently transmitted characteristics of the local communication signals 116. Since the RCS CP device 150 comprises WLAN protocol functionality, it may also monitor the global traffic in the global access area 128 so as to receive transmission information indicative of previously and currently transmitted characteristics of the global communication signals 126. In addition, the transmission characteristics may be obtained by decoding and/or demodulating the received information packet transmission from the communication signals 116, 126 in the wireless network 100. More specifically, the RCS CP device 150 may poll or "listen" to information contained in the communication signals 116, 126 derived from BT and WLAN wireless devices 112, 122 to identify the transmission characteristics that relate to how data packets are being transmitted. As previously described, the packet transmission characteristics may include information as to the order or arrangement of data packets, the timing of transmission of the data packets, and the frequency or channel that the data packets will be transmitted on.

Upon receiving the transmission characteristics in the state 404, the RCS CP device 150 may generate a local timing map 320 in a state 406 in a manner as referenced by FIG. 3B. After generating the local timing map 320 in the state 406, the RCS CP device 150 transmits the local timing map 320 to the WLAN AP device 120 in a state 408. Then, in a state 410, the RCS CP device 150 receives global communication signals 128 from the WLAN AP device 120. The global communication signals 126 may comprise information relating to available transmission cycle periods. In a state 412, the RCS CP device determines the available cycle periods from the received information and further allows the BT wireless devices 112 to transmit information in the available cycle periods. In one embodiment, if the packet transmission traffic in the local access area 118 is determined not to be subject to concurrent transmissions which might cause interference, the RCS CP device 150 does not interrupt the data traffic and permits BT wireless devices 112 to send information without moderation. If however, a data collision or protocol interference between the BT and WLAN communication signals 116, 126 is anticipated or detected, the RCS CP device 150 may proceed through a series of collision avoidance measures designed to redirect wireless traffic in such a manner so as to prevent or minimize signal interference.

Alternatively, in the state 412, the remotely-cooperative scheduling process 400 may commence with the RCS CP device 150 making a determination as to how to modify current and subsequent packet ordering to reduce or eliminate the anticipated or detected interference. In one aspect, the RCS CP device 150 comprises hardware that may buffer or queue the data packets to permit the temporary storage of data packets. The RCS CP device 150 may additionally use information contained in the buffer or queue to determine ahead-of-time or future timing arrangements to avoid potentially interfering data transmissions in the wireless network. The RCS CP device 150 may further make use of the buffer or queue along with decoded data packet information to determine the timing and ordering in which packets should be transmitted so as not to interfere with other data packets that are currently in a state of transmission in the wireless network. For example, as new packets are received by the RCS CP device 150, the portion of the data packet corresponding to header information may be decoded. As previously described, the header contains transmission information such as timing and frequency of transmission characteristics which may be readily used by RCS CP device 150 to schedule buffered or queued data so as to prevent overlapping data transmissions.

Additionally, the RCS CP device 150 may update the packet timing information, as needed, to reschedule data packets and then transfer the updated information to the WLAN AP device 120. When updating the packet timing information for the data packets, the RCS CP device 150 may also update or modify the information contained in the data packet to reflect the update packet timing information. For example, the RCS CP device 150 may modify the header information contained in the buffered or queued packets in a manner such that, upon transmitting the data packets, other devices within the network which receive the data packets may interpret the header information to subsequently influence the data transmission characteristics of these other devices.

After the RCS CP device 150 permits the exchange of information packets of local communication signals 116 in the state 414, the remotely-cooperative scheduling process 400 advances to a decision state 416. In the state 416, the RCS CP device 150 determines whether to continue monitoring the local network traffic. If the RCS CP device 150 decides to continue monitoring the local network traffic, then the process 400 loops back to the state 404. Otherwise, the process 400 terminates in an end state 418.

Figure 5:
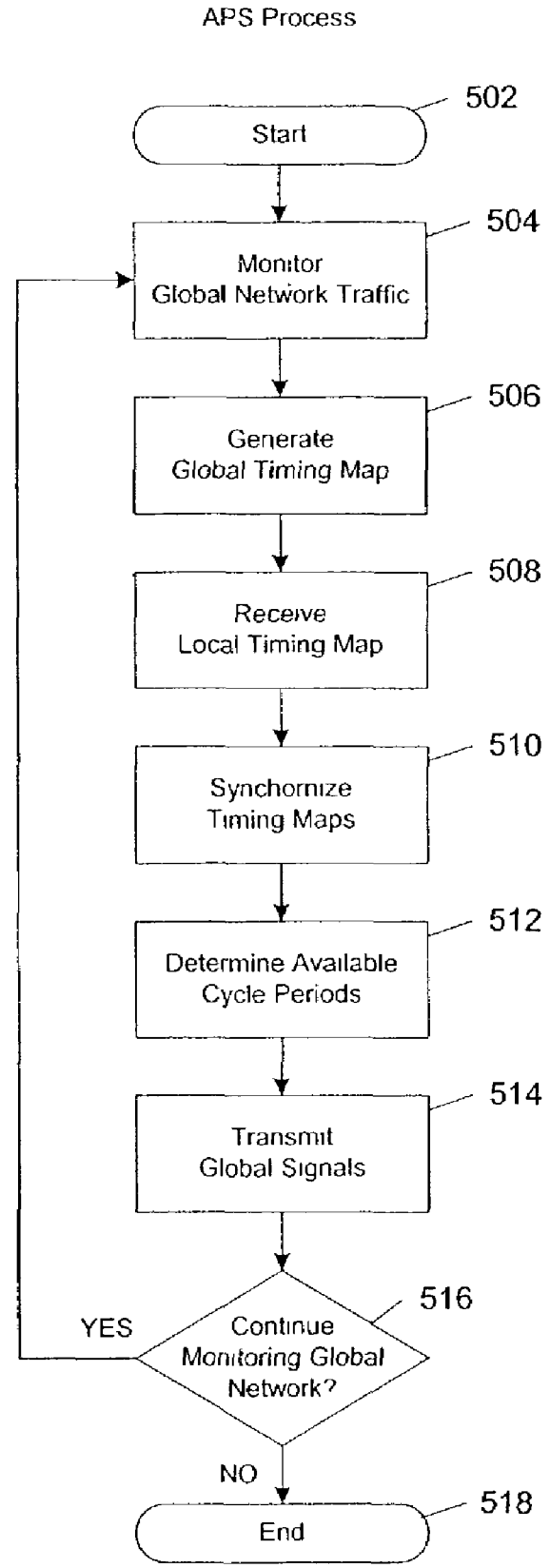
FIG. 5 illustrates one embodiment of an access point scheduling process, wherein the at least one access point device of FIG. 2B generates the global timing map of FIG. 3C.

FIG. 5 illustrates one embodiment of an access point scheduling process 500, wherein the WLAN AP device 120 of FIG. 2B generates the global timing map 350 of FIG. 3C. The access point scheduling process 500 commences in a start state 502 and then advances to a state 504, where the RCS CP device 150 monitors the global network traffic in the global access area 128. The WLAN AP device 120 is configured to receive transmission information indicative of previously and currently transmitted characteristics of the global communication signals 126 including WLAN encoded communication signals from the RCS CP device 150. In addition, the transmission characteristics may be obtained by decoding and/or demodulating the received information packet transmission from the global communication signals 126 in the wireless network 100. In particular, the WLAN AP device 120 may extract information comprised within the global communication signals 126 to identify the transmission characteristics that relate to how global information packets are being transmitted. As previously described, the packet transmission characteristics may include information as to the order or arrangement of data packets, the timing of transmission of the data packets, and the frequency or channel that the data packets will be transmitted on.

Upon receiving the transmission characteristics of the global communication signals 126 in the state 504, the WLAN AP device 120 may generate a global timing map 350 in a state 506 in a manner as referenced by FIG. 3C. After generating the global timing map 350 in the state 506, the WLAN AP device 120 is configured to receive the local timing map 320 from the RCS CP device 150 in a state 508. As previously described, since the RCS CP device 150 is configured to encode communication signals as valid WLAN information packets, the local timing map is transmitted to the WLAN AP device 120 as a valid WLAN information packet. Then, in a state 510, the WLAN AP device 120 synchronizes the information packet timing of the local timing map 320 with the global timing map 350 so as to identify impending collisions between communication signals 116, 126. In one aspect, the RCS CP device 150 may transmit a timing base signature that synchronizes the local timing base 222 with the global timing base 252. It should be appreciated that the order in which the WLAN AP device 120 synchronizes the information packet timing of the timing maps 320, 350 may vary without departing from the scope of the present invention.

The global communication signals 126 may comprise information relating to available transmission cycle periods. In a state 512, the WLAN AP device 120 determines the available cycle periods from the received information and further allows the WLAN wireless devices 122 to transmit information in the available cycle periods. In one embodiment, if the packet transmission traffic in the global access area 128 is determined not to be subject to concurrent transmissions which might cause interference, the WLAN AP device 120 does not interrupt the data traffic and permits WLAN wireless devices 122, including the devices controlled by the RCS CP device 150, to send information without moderation. If however, a data collision or protocol interference between the BT and WLAN communication signals 116, 126 is anticipated or detected, the WLAN AP device 120 may proceed through a series of collision avoidance measures designed to redirect wireless traffic in such a manner so as to prevent or minimize signal interference in the wireless network 100.

Alternatively, in the state 512, the WLAN AP device 120 may influence the coordination of global transmissions by making a determination as to how to modify current and subsequent packet ordering to significantly reduce detected interference. In one aspect, the WLAN AP device 120 may comprise the scope and functionality of the RCS CP device 150 as described with reference to the state 412 in FIG. 4. The WLAN AP device 150 monitors the wireless network 100 so as to coordinate the transmission traffic of frequency-overlapping protocols by prioritizing data packets in a manner so as to determine when to transmit data packets on an open channel. If the WLAN AP device 120 determines from the global timing map 350 that interference or a collision is likely to occur in a specific transmission cycle period, then the WLAN AP device 120 may assert a busy signal on the wireless network during that specific transmission cycle period in a state 514. Asserting a busy on the wireless network 100 informs the WLAN functioning devices 122, 150 that a transmission channel is unavailable. As a result, the WLAN functioning devices 122, 150 may wait for an available channel. Otherwise, the WLAN functioning devices 122, 150 may transmit data packets without moderation from the WLAN AP device 120.

Additionally, in the state 514, the WLAN AP device 120 may transmit other global communication signals 126 including information relating to available transmission channels or available transmission cycle periods to the WLAN functioning devices 122, 150 in the wireless network 100. By informing the WLAN functioning devices 122, 150 of channel availability, the devices may schedule transmissions so as to avoid interference or collisions. Therefore, the RCS CP device 150 may coordinate the exchange of information between the BT devices 112 in the local access area 118 in a manner that does not conflict or create interference with the exchange of information in the global access area 128. Advantageously, the RCS CP device 150 may utilize the global timing information received from the WLAN AP device 120 to prioritize, schedule, and moderate local transmission traffic in the local access area 118 to reduce or avoid interference caused by signal collisions where overlapping communication frequencies coexist.

After the WLAN AP device 120 permits the exchange of information packets of global communication signals 126 in the state 514, the access point scheduling process 500 advances to a decision state 516. In the state 516, the WLAN AP device 120 determines whether to continue monitoring the global network traffic. If the WLAN AP device 120 decides to continue monitoring the global network traffic, then the process 500 loops back to the state 504. Otherwise, the process 500 terminates in an end state 518.

In the various embodiments of the previously described collision avoidance method, a remotely-cooperative scheduling device that moderates a plurality of frequency-overlapping protocols simultaneously is advantageous to implement into a wireless network. Moderation of multiple protocols provides a greater level of control and permits the remotely-cooperative scheduling device to effectively manage multiple protocols within the wireless network to insure that service level efficiency is maintained. However, it should be apparent that the above-described remotely-cooperative scheduling device may provide moderation control using a single wireless communication protocol in the wireless network. The single protocol configuration of the remotely-cooperative scheduling device may effectively moderate data traffic to prevent data collisions or interference, which may degrade data packet throughput.

In the development of numerous wireless communication standards, the use of the remotely-cooperative scheduling process provides a flexible yet powerful way to substantially insure compatibility among frequency-overlapping wireless communication devices in a wireless network. Therefore, the above mentioned remotely-cooperative scheduling process may be used to improve data throughput and prevent undesirable data corruption and network latency. Coordination of frequency-overlapping protocols using the aforementioned wireless traffic coordination device, system, and method permits the use of numerous classes of wireless communication devices, which were until now incompatible with one another.

Although the following description exemplifies various embodiments of the present invention, it should be understood that omissions, substitutions, and changes in the form of the detail of the apparatus, system, and method as illustrated, as well as the uses thereof, may be made by those skilled in the art, without departing from the spirit of the present invention. Consequently, the scope of the present invention should not be limited to the disclosed embodiments, but should be defined by the appended claims. Reference will now be made to the drawings wherein like numerals refer to like parts throughout.

What is claimed is:

1. A coordination system for a wireless communication network in which a plurality of signal transmissions obtained from a first protocol and a second protocol operate using overlapping communication frequencies, the system comprising:

at least one slave station, which receives and transmits data in at least one of the protocols;

at least one monitoring station, which monitors transmissions of the at least one slave station and generates a local timing map by acquiring transmission timing characteristics of the at least one slave station and tracking of the at least one slave station transmission sequences, the local timing map further indicating windows of transmission availability and masked regions of transmission unavailability; and a coordinative access point, which acquires the local timing map, tracks global transmission sequences, and generates a global timing map to moderate transmissions in the wireless communication network to reduce collisions by scheduling global transmissions within the windows of transmission availability indicated by the local timing map.

2. The system of claim 1, wherein the at least one slave station is a wireless communication device that uses a frequency-hopping spread spectrum protocol or a direct-sequence spread spectrum protocol.

3. The system of claim 2, wherein the at least one monitoring station further possesses functionality to act as a master device capable of moderating transmissions of the at least one slave station.

4. The system of claim 1, wherein the at least one monitoring station is a wireless communication device that monitors transmissions of at least one slave station using a frequency-hopping spread spectrum protocol or a direct-sequence spread spectrum protocol.

5. The system of claim 1, wherein the at least one monitoring station is a wireless communication device which operates using a frequency-hopping spread spectrum protocol and a direct-sequence spread spectrum protocol.

6. The system of claim 1, wherein the coordinative access point is a wireless communication device that monitors and coordinates transmissions of the at least one monitoring station using a frequency-hopping spread spectrum protocol or a direct-sequence spread spectrum protocol.

7. The system of claim 1, wherein the coordinative access point asserts busy on the wireless communication network to reduce collisions.

8. A coordination system for a wireless communication network in which a plurality of wireless communication devices transfer information using a first frequency-overlapping communication protocol and a second frequency-overlapping communication protocol, the system comprising:

a global access area comprising at least one local access area, wherein the local access area comprises at least one wireless communication device;

a local coordination device, which monitors the transmissions in the at least one local access area and generates at least one local timing map indicative thereof; and a global coordination device, which receives the at least one local timing map and generates a global timing map indicative thereof, wherein the global timing map is used to coordinate transmissions in the global access area and to reduce collisions in the wireless communication network by scheduling the transfer of information between the plurality of wireless communication devices.

9. A coordination system for a wireless communication network in which a first plurality of communication devices using a first protocol and a second plurality of communication devices using a second protocol exchange frequency-overlapping transmission signals, the system comprising:

a global network comprising a plurality of local networks;

a plurality of local timing map generators, wherein each of the plurality of local networks comprises at least one of the plurality of local timing map generators, and wherein the at least one local timing map generator monitors the transmission signals in at least one of the plurality of local networks and generates at least one local timing map indicative thereof; and a global timing map generator, which receives one or more of the plurality of local timing maps and generates a global timing map indicative thereof, wherein the global timing map is used to coordinate frequency-overlapping transmission signals in the global network to reduce collisions in the wireless communication network by scheduling the transfer of information between the plurality of wireless communication devices.

10. The system of claim 9, wherein the global timing map generator produces a timing mask for one or more of the plurality of local networks, wherein the timing mask identifies a timing sequence of the frequency-overlapping transmission signals in the wireless communication network.

11. The system of claim 10, wherein the timing mask comprises one or more available time periods in which the global timing map generator schedules the transfer of information between the plurality of wireless communication devices to reduce collisions in the wireless communication network.

12. The system of claim 11, wherein the global timing map generator manages a plurality of timing masks for scheduling the transfer of information between the plurality of wireless communication devices to reduce collisions in the wireless communication network.

13. A system for resolving collisions between wireless communication nodes which send and receive data using two or more protocols having overlapping frequencies, the system comprising:

a local monitoring station, which identifies the wireless exchange of information in at least one of the frequency-overlapping protocols in a local access area, wherein a plurality of local wireless network devices operate by exchanging information using at least one of the frequency-overlapping protocols, the local monitoring station further creating a timing map which indicates open regions of transmission availability; and an global access point, which receives the timing map and prioritizes the wireless exchange of information in at least one of the frequency-overlapping protocols to reduce data collisions by coordinating the exchange of information with the local monitoring station through the use of the timing map.

14. A method of coordinating data transmissions in a wireless communication network in which wireless data exchange protocols comprising a first protocol and a second protocol operate using overlapping communication frequencies, the method comprising:

recognizing at least one subset of local wireless communication devices so as to identify timing characteristics of the local wireless communication devices;

generating a first timing map indicative of transmission characteristics of the at least one subset of local wireless communication devices so as to identify periods of transmission availability;

recognizing global wireless communication devices positioned outside of the at least one subset of local wireless communication devices so as to identify timing characteristics of the global wireless communication devices; and using the first timing map to track corresponding data transmission sequences and periods of transmission availability and further scheduling data exchange in the global wireless communication devices during the periods of transmission availability so as to reduce collisions with the local wireless communication devices.

15. A communications network system, wherein wireless data exchange protocols comprising a first protocol and a second protocol operate using overlapping communication frequencies, the system comprising:
- a local timing map generator that is configured to acquire transmission timing characteristics of local wireless communication devices, track local transmissions, and generate a local timing map;
- a global timing map generator that is configured to acquire the local timing map, track global transmissions, and generate a global timing map; and
- a traffic coordination component that is configured to use the global timing map to reduce frequency-overlapping collisions by scheduling transmission sequences in a manner so as to avoid collisions in data exchange using the first protocol and the second protocol.

16. The system of claim 15, wherein the local timing map and the global timing map comprise periods of transmission availability, wherein transmissions may be scheduled by the traffic coordination component to avoid collisions.

17. The system of claim 16, wherein windows of transmission availability may be created by moderating the first or the second protocol.

18. The system of claim 17, wherein moderation of the first or the second protocol is accomplished using a jamming signal which transiently delays or defers the transmission of the first or the second protocol.

19. The system of claim 15, wherein the local timing map generator monitors transmission timing characteristics of local wireless communication devices that are nearby and generates a local timing map indicative thereof.

20. The system of claim 15, wherein acquiring transmission timing characteristics further comprises identifying one or more transmission traffic types within the wireless data exchange protocols and determining one or more quality of service parameters for the one or more transmission traffic types.

21. The system of claim 20, wherein the one or more quality of service parameters are used by the global timing map generator to assist in the generation of the global timing map.

22. The system of claim 20, wherein the one or more quality of service parameters are used by the local timing map generator to assist in the generation of the local timing map.

23. The system of claim 20, wherein the one or more transmission traffic types comprise a voice quality traffic type and a data quality traffic type.

24. The system of claim 20, wherein scheduling transmissions comprises dynamically prioritizing the transmission traffic types based on the acquired transmission timing characteristics.

25. The system of claim 20, wherein the wireless data exchange protocols further comprise prioritizing the transmission traffic types based on predetermined levels of quality of service.

26. The system of claim 15, wherein the local timing map and the global timing map comprise masked domains indicative of regions of transient unavailability, wherein further transmission scheduling within the masked domains is avoided to inhibit collisions.

27. The system of claim 15, wherein the local timing map generator monitors the transmission activity in a Bluetooth piconet and generates the local timing map indicative thereof.

28. The system of claim 27, wherein the global timing map generator monitors the transmission activity in a wireless local area network (WLAN) operating in an overlapping transmission area used by the Bluetooth piconet.

29. The system of claim 28, wherein the local timing map generator comprises a WLAN station which further acts as a master for the Bluetooth piconet, wherein the master controls upstream and downstream data exchange between wireless communication devices within the Bluetooth piconet.

30. The system of claim 29, wherein the global timing map generator comprises an access point which exchanges data with the WLAN station.

31. The system of claim 30, wherein the access point connects the WLAN to a backbone network which links the wireless communication network to the backbone network.

32. The system of claim 15, wherein the first and second protocols are frequency-hopping spread spectrum protocols or direct-sequence spread spectrum protocols.

33. The system of claim 15, wherein the first and second protocols are Bluetooth protocols or WLAN protocols.

34. The system of claim 15, wherein the local timing map generator and the global timing map generator are used in conjunction with a plurality of wireless communication devices which operate using a least one of the plurality of data exchange protocols such that the local and global timing map generators moderate the traffic flow between the wireless communication devices to reduce data collisions and improve data throughput.

* * * * *